PHOTOGRAPHIC STORAGE UNIT FOR DIGITAL INFORMATION

Filed Nov. 23, 1956 2 Sheets-Sheet 1

INVENTORS
CHARLES H. DOERSAM JR.
ROBERT W. KING JR.
BY C. V. Craddock
ATTORNEY

PHOTOGRAPHIC STORAGE UNIT FOR DIGITAL INFORMATION

Filed Nov. 23, 1956 2 Sheets-Sheet 2

INVENTORS
CHARLES H. DOEHSAM JR.
ROBERT W. KING JR.
BY
L. V. Craddock
ATTORNEY 2,907,985

PHOTOGRAPHIC STORAGE UNIT FOR DIGITAL INFORMATION

Charles H. Doersam, Jr., and Robert W. King, Jr., Port Washington, N.Y., assignors to Sperry Rand Corporation, a corporation of Delaware Application November 23, 1956, Serial No. 624,157

5 Claims. (Cl. 340—173)

The invention relates generally to storage devices for digital information and, more specifically, to storage means adapted to receive input digital data and operative to record said data on light sensitive film.

Film recording of information has been widely developed and established in the various arts. One proposed solution to the problem of recording digital data on film is given in Patent 2,596,741, issued to A. W. Tyler et al. on May 13, 1952. According to the invention of that patent, digital pulses generated by a data source are applied to the vertical deflecting plates of a cathode ray tube, the horizontal sweep for which is independently generated but triggered in synchronism with the travel of the film on which the digital data is to be stored. The cathode ray tube is utilized as a light source which, in combination with an appropriate mask, creates an image of digital information which is exposed on the film. Inasmuch as some finite time is involved in the traversal of the electronic beam across the face of the cathode ray tube, the basic bits, a predetermined plurality of which comprise a digital character, are sequentially exposed on the face of the film.

In view of the sequential exposure, it is desirable that the film be stationary during the time of exposure or that it travel at a uniform speed in order to minimize "bending" of the lines of digital information stored thereon. Additionally, some means must be provided in the prior art apparatus to minimize the spurious deflection of the electron beam of the cathode ray tube in order to prevent false digital data. That is, it is necessary to insure that the cathode ray tube beam will be deflected solely by the presence and nature of the digital information and not by external sources including stray magnetic fields.

It is the object of the present invention to provide for an improved apparatus for the recording of digital information on film.

Another object is to provide means for the storage of digital information on film whereby the basic bits comprising a digital character are simultaneously, rather than sequentially exposed on the film.

An additional object is to provide an improved photographic digital storage device wherein maximum information is placed on a given film area.

Yet another object is to provide a photographic digital storage apparatus adapted to operate under conditions of non-uniform film travel.

These and other objects of the present invention, as will appear as the description proceeds, are achieved by the provision of a data source which feeds binary information preferably in the form of sequential electrical pulses, each pulse representing a binary bit, to a binary data dispensing device in response to a first control signal. The first control signal is also applied to a first control input of the dispensing device to store therein a predetermined number of the sequential output pulses from the data source comprising a binary character.

A second control signal, having a repetition rate fractionally related to that of the first signal, is applied to a second control input of the dispensing device to produce a plurality of simultaneous pulse outputs therefrom, each output representing a respective component binary bit of the stored binary character. Each of the simultaneous pulse outputs trigger respectively associated light sources as xenon flash lamps.

The light sources are specially oriented in a manner to be more fully described in order to maximally utilize the area of the film. An image reducing system is included in the present invention to direct the image created by the light source on the face of photographic film which may be continuously traveling.

The operation of the dispensing device is synchronized with translation of the film by the first control signal which is generated by means producing an output signal every time a predetermined linear distance is traversed by the moved film.

The apparatus of the present invention is readily adaptable to the inverse procedure of converting the photographically stored digital data into electrical binary signals.

For a fuller understanding of the present invention reference should be had to the following description and the appended figures of which:

Figure 1:
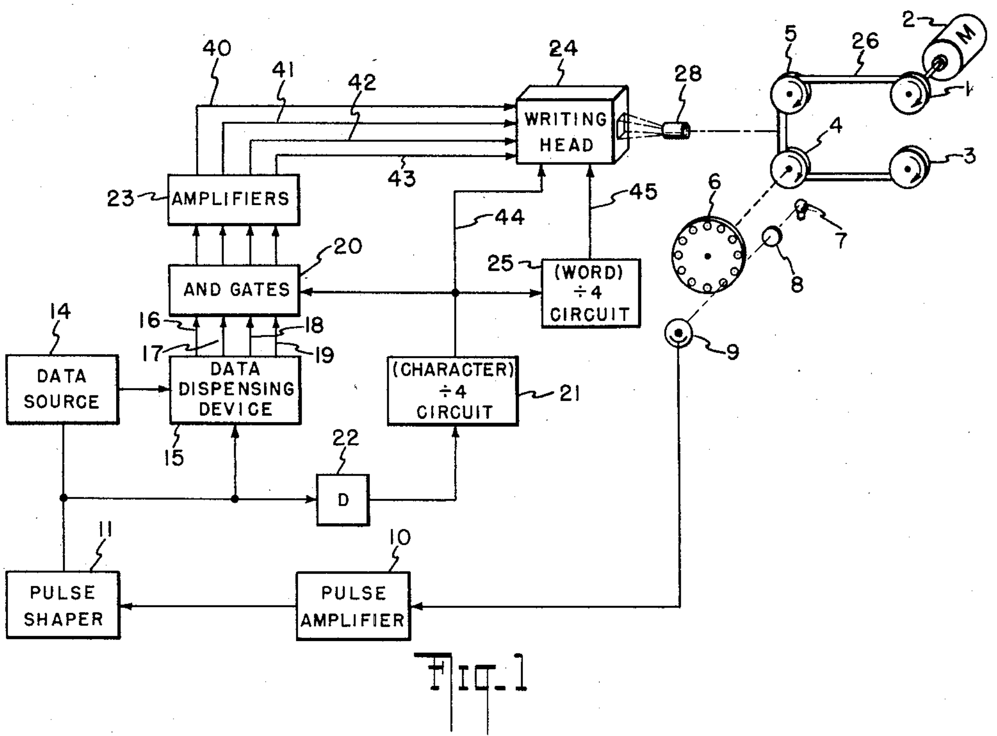
Fig. 1 shows a preferred embodiment of the recording apparatus of the present invention.

In Fig. 1, reel 1 is driven by motor 2 thus moving light sensitive film 26 from storage reel 3 and out to and around idler wheels 4 and 5. Idler 4 is mechanically linked to disc 6 along whose circumference a plurality of apertures are cut. Lamp 7, together with lens 8, direct a beam of light at a fixed radial distance from the axis of disc 6 whereat the aforementioned apertures are positioned. Photocell 9 responds to individual light pulses produced by the sequential interruption and transmission of the light beam emanating from lamp 7 as disc 6 rotates.

The pulse outputs of photocell 9 are applied to pulse amplifier 10 which, in turn, is connected to pulse shaper 11. Pulse shaper 11 may be a conventional monostable multivibrator producing an output pulse having a predetermined width following the occurrence of an input pulse as obtained from the output of pulse amplifier 10. The output of pulse shaper 11 is simultaneously applied to first inputs of data source 14 and data dispensing device 15 both of which may be of a shifting register type, for example, as described on pages 144–148 of "Arithmetic Operations in Digital Computers," by R. E. Richards, published by D. Van Nostrand Company, Inc., 1955.

The numeral 14 generally designates a source of digital information producing a sequence of output electrical pulses having voltage levels, for example, corresponding to a "one" or a "zero" in response to respective shifting pulses applied to its first input. The sequentially shifted output of source 14 is applied to a second input of dispensing register 15. Lines 16, 17, 18 and 19 represent parallel outputs of respective component stages of register 15.

A plurality of And gates 20 are provided corresponding in number to the number of outputs from register 15 and are respectively coupled thereto. Second input to And gates 20 are obtained from the output of divide-by-four circuit 21 and its associated delay 22 which operate to produce a pulse output shortly following a predetermined number of pulse inputs applied to delay 22. The predetermined number corresponds to the number of bits comprising a digital character; four are shown by way of example.

Thus, And gates 20 produce respective outputs upon the simultaneous occurrence of a pulse at the output of divide-by-four circuit 21 and a predetermined one of the two possible states of conduction of the individual stages comprising register 15.

The respective outputs of And gates 20 are applied to individual corresponding amplifiers generally designated by the numeral 23 from whence they are applied via lines 40, 41, 42 and 43 to writing head 24. Additional inputs to head 24 on lines 44 and 45 are respectively obtained from the output of divide-by-four circuit 21 and divide-by-four circuit 25. Divide-by-four circuit 25 produces a pulse output for every sixteenth occurrence, for example, of an output from delay 22 as a result of being cascaded with divide-by-four circuit 21. Circuit 25 divides by a factor equalling the number of binary characters comprising a binary word.

Figure 2:
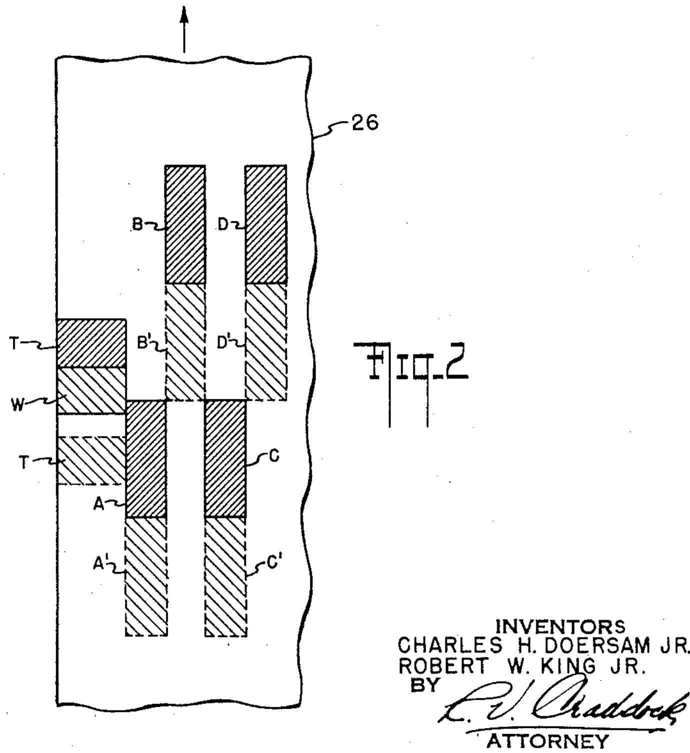
Fig. 2 illustrates the spacial arrangement of exposed binary data on the photographic film.

The manner with which writing head 24 responds to its plurality of inputs is described in connection with Figs. 2 and 3. In Fig. 2 a strip of film is shown which may be, for example, the longitudinal strip of film bordering the film area on which an optical image may be exposed. It is to be noted that the staggered layout of binary data on film by means of the present invention, whereby minimum film area is used, readily lends itself to the recording of such data on the marginal strip occurring along the edge of ordinary motion picture film.

The shaded areas designated by the letters A, B, C and D represent the spacial location of the individual binary bits comprising a binary character as simultaneously exposed on the film. Again, four bits are shown as comprising the binary character by way of example. A suitable convention that may be adopted is that the respective film area will be exposed upon the occurrence of a binary bit corresponding to a "one" and left unexposed by the occurrence of a "zero."

Figure 4:
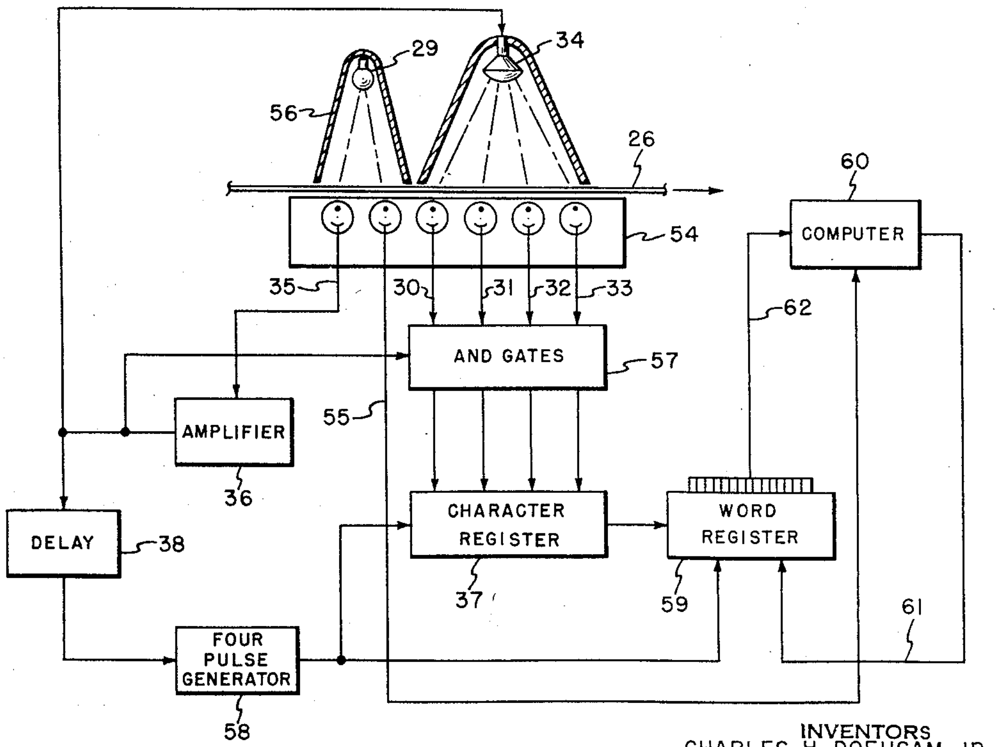
Fig. 4 illustrates the "play back" structure of the present invention.

A timing mark designated by the shaded area T is also exposed on the film alongside each binary character for purposes of synchronizing the "play back" apparatus of Fig. 4.

For purposes of designating the end of binary words, comprising a predetermined number of binary digits, the shaded area W is utilized.

The interlacing of sequential binary characters is illustrated by the position of the shaded areas designated A′, B′, C′, and D′ which will be exposed at a later time than the binary characters A, B, C and D in its own order as the film 26 travels by the writing head 24 of Fig. 1. An advantage of the interlacing of the exposed areas on film 26 is that all the film area reserved for the recording of digital information is utilized without any wasted blank spaces in between the component binary bits.

Figure 3:
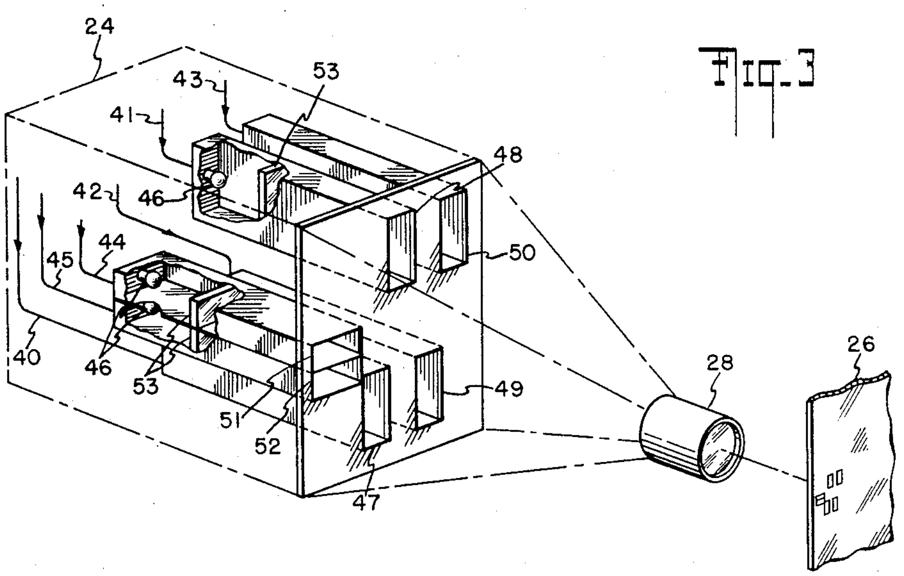
Fig. 3 is a schematic view, partly in cross-section, of a representative writing head for use with the invention.

A schematic view, partly in cross-section, of a typical writing head for use with the present invention is shown in Fig. 3. Writing head 24 includes six rectangular light sources 47, 48, 49, 50, 51, and 52 and each containing a flash lamp 46, three of which appear in the drawing. Light diffusing means 53 is inserted into each light source.

In operation, and with reference to Fig. 3, individual flash lamps 46 contained within writing head 24 are illuminated in response to the pulse outputs appearing on respectively associated lines 40, 41, 42, 43, 44 and 45. Assuming, for example, that the binary character comprises four bits of binary information, all of which are "one" information, the film 26 of Fig. 2 will be exposed in the areas designated by A, B, C and D. Simultaneously with the exposure of the aforementioned areas sector T will be exposed in response to the input 44 to writing head 24 as derived from the output of divide-by-four circuit 21 of Fig. 1. At the completion of a binary word, following a predetermined number of binary characters, area W of Fig. 2 is exposed in response to the input 45 to writing head 24 as derived from divide-by-four circuit 25 of Fig. 1. Image reducing lens 28 focuses the image of the face of writing head 24 on the film 26.

From the foregoing it will be apparent that the exposure of digital information on the travelling film 26 of Fig. 1 is not dependent upon the maintenance of uniform travel speed by means of motor 2. If the speed of motor 2 increases, for example, the repetition rate of light pulses impinging upon photocell 9 correspondingly increases, in turn increasing the rapidity with which the lamps of writing head 24 are illuminated. When motor 2 slows down, the operation of the photographic storage device of Fig. 1 is compensatingly retarded.

The time duration of the exposure of the respective areas of film 26 corresponding to the areas A, B, C, D, T and W of Fig. 2 may be controlled by adjustment in pulse shaper 11 of the duration of the output pulse therefrom.

The present invention is readily adaptable, as shown in Fig. 4, to the inverse procedure of "reading back" digital information stored on photographic film 26. In Fig. 4, light source 29 whose rays are screened by a light baffle 56 continuously illuminates the longitudinal strip of film 26 along which the timing areas T are exposed. Positioned behind the exposed and moving film 26 is a read out head 54 which is similar to writing head 24 of Fig. 3 except that photoelectric cells 30, 31, 32, 33, 35 and 55 are substituted for the flash lamps 46. The circuits of photo cells 30, 31, 32 and 33 may be adapted to respond to the absence of light from flash lamp 34 when blocked by a respectively exposed film area. Lamp 34 is illuminated in response to a pulse output from photoelectric cell 35 located behind film 26 whenever an exposed area T passes by. The output of photocell 35 is amplified in amplifier 36 and applied to flash lamp 34 and delay 38. The output of amplifier 36 is also applied to And gates 57, second inputs to which are respectively derived from corresponding photoelectric cells 30, 31, 32 and 33.

The output of delay 38 is applied to four pulse generator 58 whose design is well known in the computer art for producing a predetermined number of output pulses in response to an input pulse and in a time interval less than the period of the input pulses. Such a pulse generator may comprise, for example, a monostable multivibrator triggered by the pulse output of delay 38, an electronic gas and a source of clock pulses having a period less than one-fourth that of the pulses appearing at the output of delay 38. The reset time of the multivibrator is adjusted to permit four clock pulses to pass through the gate following the occurrence of an output pulse from delay 38 in a well-known manner. The output of generator 58 serially shifts the digital information out of register 37 which was stored therein in parallel fashion by the outputs of And gates 57.

Word register 59 is adapted to receive the serial output of register 37 and responds to the output of generator 58 so that the serial shifting of data within register 59 is synchronized with that of register 37.

Upon the occurrence of a word pulse as detected by photoelectric cell 55 and applied to computer 60, computer 60 sends a corresponding pulse via line 61 to register 59 to read out the data stored therein in blocks corresponding to digital words. The word data shifted out of register 59 appear on line 62 whereon they are available for application to any digital data utilization device such as generally represented by computer 60.

It may be seen from the preceding that the objects of the present invention have been achieved by the provision of apparatus, synchronized with the movement of film travelling at a non-uniform speed for simultaneously exposing individual component areas thereof corresponding to basic units of binary information comprising binary characters. The interleaving of successive binary characters as shown in the layout of Fig. 2 provides for the recording of maximum binary information on a given available film area.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A storage device for binary data comprising a shifting register having a capacity corresponding to a predetermined number of electrical signals each representing a binary bit and having a plurality of output conductors, means for reading said pulses out of said register in parallel fashion whereby characteristic pulses simultaneously appear on respective output conductors, individual means coupled to said conductors for illuminating an array of light sources each arranged at a relative location corresponding to a respective pulse, means for photographing said array and means synchronized with said photographing means for operating said shifting register.

2. Apparatus as defined in claim 1 wherein said means for illuminating comprises gas filled discharge lamps.

3. Means for photographing digital information on film comprising means for translating said film, means coupled to said translating means for producing a control signal in response to a predetermined lineal travel of the film, means for storing a predetermined number of electrical signals each corresponding to a respective digital bit, said means for storing being actuatable by said control signal to produce a simultaneous plurality of output pulses each corresponding to a respective digital bit, individual means responsive to said output pulses for illuminating a pattern of apertures each having a discrete non-abutting spacial location related to a respective pulse, and means for imaging said pattern on said film.

4. A digital data storage device comprising light sensitive film, means for translating said film, means coupled to said translating means for producing control pulses in response to a predetermined lineal travel of the film, means for storing a predetermined number of electrical signals each corresponding to a respective digital bit, said means for storing being actuatable by said control pulses to produce a simultaneous plurality of output pulses each corresponding to a respective digital bit, individual means responsive to said output pulses for illuminating a pattern of apertures each having a discrete non-abutting spacial location related to a respective pulse, repetition rate dividing means adapted to receive said control pulses to produce at least one sub-harmonically related pulse output, means coupled to the output of said dividing means for illuminating additional respective apertures, and means for imaging said pattern and said additional apertures on said film.

5. Apparatus comprising a shifting register adapted to receive a serial input of digital pulses and operative to produce a simultaneous pulrality of parallel output pulses in response to a control signal, a plurality of light sources equalling in number the number of component stages of said register, each source including means for illumination respectively coupled to a corresponding output of said register, means for photographing said light sources and means synchronized with said photographing means for producing said control signal.

References Cited in the file of this patent

UNITED STATES PATENTS 2,714,841 Demer et al. ............ Aug. 9, 1955